United States Patent [19]

Giles et al.

[11] Patent Number: 5,213,603
[45] Date of Patent: May 25, 1993

[54] FLEXIBLE PLUNGER APPARATUS FOR A GLASS FORMING MACHINE

[75] Inventors: Edwin Q. Giles, Beaver Dams; Jackson P. Trentelman, Painted Post; Jason S. Watts, Horseheads, all of N.Y.

[73] Assignee: Corning Incorporated, Corning, N.Y.

[21] Appl. No.: 852,984

[22] Filed: Mar. 16, 1992

[51] Int. Cl.$^5$ .................................. C03B 11/06
[52] U.S. Cl. ........................... 65/305; 65/323; 65/362; 425/406
[58] Field of Search ............. 65/305, 307, 319, 323, 65/362; 425/577, 469, 406

[56] References Cited

U.S. PATENT DOCUMENTS

| | | |
|---|---|---|
| 947,632 | 1/1910 | Bolton . |
| 1,655,917 | 2/1926 | Obiol . |
| 1,898,251 | 1/1929 | Kopp . |
| 2,252,292 | 8/1941 | Poglein ............................ 65/305 |
| 2,966,007 | 3/1958 | Sherts et al. . |
| 4,272,273 | 6/1981 | Trahan et al. ................... 65/167 |
| 4,661,143 | 4/1987 | Foster ............................. 65/362 |
| 4,786,444 | 11/1988 | Hwang ............................ 264/1.4 |
| 4,824,460 | 4/1989 | Fenton ............................ 65/68 |
| 4,888,040 | 12/1989 | Douglas et al. ................. 65/307 |

FOREIGN PATENT DOCUMENTS 83271 4/1952 Fed. Rep. of Germany .
2060470 3/1981 United Kingdom .

Primary Examiner—Joye L. Woodard
Attorney, Agent, or Firm—Timothy M. Schaeberle

[57] ABSTRACT

A plunger/ring apparatus for press-forming articles of glass, or other formable materials within a mold is disclosed. The disclosed plunger/ring apparatus is provided with a plurality of spring loaded segments which extend outwardly from the plunger to coact with engineered passageways located upon the inner wear surface of the ring to form a seal in the plunger/ring interface area in which air, but not the material to be press-formed, may pass to and from ambient upon press-forming the formable material. An alternative embodiment is also disclosed in which the engineered passageways are located upon the wear surfaces of the segments and with optional additional passages located upon the upper periphery of the plunger.

11 Claims, 4 Drawing Sheets

FLEXIBLE PLUNGER APPARATUS FOR A GLASS FORMING MACHINE

This invention relates generally to the design of glass forming tooling, and specifically to such tooling utilizing rings, or shells, and a plunger for press-forming articles in a mold.

BACKGROUND OF THE INVENTION

Traditionally, pressed glass items such as television panels, lighting face plates and reflectors, and various consumer items utilize a metal ring, or shell in the case of TV panels and similarly shaped objects, to both strip the glass from the plunger and close off the cavity at the early points of filling the mold with the material to be press-molded. This necessitates relative motion between the plunger and ring as the plunger is pushed through the ring to achieve fill in the cavity.

The interface where the ring and plunger meet, commonly referred to as the bore area, is typically the sight, and source of a host of forming defects in the molded article resulting from: a) the relative motion between the plunger and ring which is necessary for pressing; b) the presence of a non-zero dimensional gap between the plunger and the ring at operating temperatures due to an imperfect ring to plunger fit, commonly referred to as ring fit; and c) non-uniform or non-optimal forming temperatures.

These problems may arise during steady state operation, during start-up when tooling experiences significant thermal growth, or during process transients.

Additionally, a ring fit on a typical consumer article may take 2-6 hours to hand-fit by skilled workers in the plant mold shop. This may then require additional repair on the production line, often referred to as hot repair, once it has been tried on the press in order to fine tune the ring fit so as to minimize defects on the inner edge of the pressed articles. Rarely in the glass industry is the perfect fit achieved or maintained for an extended period of time. This long standing problem of maintaining ring fit is attributable to a multitude of causes including thermal and material homogeneity, irreversible plastic flow in tooling material, article geometry, and glass composition.

Presently, ring materials are chosen based on their dimensional stability and wear characteristics relative to the plunger material. Prior art teaches that the ring be made of softer material than the plunger so that wear takes place largely in the more disposable ring. Thus, inherent ring strength and ring life considerations often become secondary. Typically cast iron, with its favorable wear characteristics and its relatively low cost, is used as a ring material despite the fact that its usefulness for certain applications is reduced by cast iron's low corrosion resistance.

Inner edge related defects on the pressed article, due to ring/plunger interface problems, are probably responsible for an overall 10% loss in acceptable product selections of a given production run. This is especially so in vehicle face plates/reflectors and consumer article production. Poor ring/plunger fit is not the only culprit for loss. The use of certain release and lubricating compounds in the ring/plunger fit area to facilitate removal of the pressed article from the mold, often leads to unacceptable residue on the articles and thereby accounts for further selection loss.

The following references disclose various methods of mold ring alignment.

U.S. Pat. No. 2,966,007 (Sherts et al.) describes an apparatus for pressing glass articles which includes a mold ring, a valve received within the mold ring, a plunger ring and a plunger received within the plunger ring having means for adjustably aligning the pressing plunger and the pressing valve by vertically aligning the inner walls of the two rings. Once vertical alignment of the plunger and valve is obtained the apparatus is locked into place.

U.S. Pat. No. 4,272,273 (Trahan et al.) provides for another adjustable glassware forming machine wherein a floating plunger mechanism is connected to a base plate which is vertically adjustable through the use of a jack screw. The bottom, or base plate, is also floating, in that it is capable of horizontal movement to accommodate slight horizontal movement of the plunger mechanism as is required in order to align the vertically movable plungers with their associated blank molds.

U.S. Pat. No. 4,786,444 (Hwang) describes an apparatus which provides for automatic alignment of mold elements. That is, this apparatus has an alignment means for bringing opposing mold halves together. This apparatus is able to form cylinder-and prism-free lenses.

Lastly, U.S. Pat. No. 4,888,040 (Douglas et al.) describes a glassware forming machine wherein an assembly is shown which provides for continuous engagement between a neck ring and guide ring, in which the guide ring is subject to wear. This continuous engagement is maintained by using spring elements.

SUMMARY OF THE INVENTION

In accordance with the present invention an apparatus for forming glass, or other formable material, is disclosed. This forming apparatus comprises a plunger, a ring, and a plunger-ring interface having a peripherally extending seal. The plunger is provided with a plurality of adjacent segments that are located in such proximity to each other to essentially prevent the glass, or other formable material, from flowing between the segments. Yet, these segments have sufficient spacing between each other to avoid binding between themselves. Disposed between the plunger segments and the ring and extending longitudinally along the plunger-ring interface are a plurality of passages. These passages allow air, but not the glass, or other formable material, to flow through the seal formed between the plunger and the ring.

The air passages are a required facet of the invention, because of the dimensional tolerances of the seal formed between the ring and plunger. Without such passageways for air escapement, an excessive vacuum would be created during pressing, which in turn would cause the glass to adhere to the plunger surface during the post-pressing release. Conversely, excessive forces would be required to initially bring the plunger into contact with the glass to be pressed without these air passageways. In other words, an engineered path for allowing air to be expelled from, and to be introduced into, the mold cavity is essential to proper functioning of the invention.

This seal, maintained through the action of the spring loaded segments, provides a continuous flexible sliding fit along the ring-bore interface during all phases of operation: start-up, steady state, process transients, and shut down. Therefore, at no time is a substantial gap presented to the glass, or other material, such that an unacceptable circumferential fin may be formed between the ring and the plunger or such that an unacceptable nubbin may be formed between adjacent segments. Similarly, abrasion of either the segments or the ring will be minimized because rubbing pressure is controlled by way of the forces exerted upon the segments by spring elements.

The present invention has numerous advantages over the prior ring/plunger assemblies used in the glass and other material forming industries today. Among these advantages are: 1) a short ring/plunger set-up time, resulting in eliminating slow, hand fitting; 2) start-up time is greatly reduced to approximately the time required to bring the molds up to operating temperature, i.e., the ring/plunger fit is maintained despite thermal expansion of the tools as they heat up; 3) inner edge defects of the formed product, i.e., fins, are essentially eliminated because there is no substantial ring/plunger gap allowing fin formation, thereby eliminating checks and subsequent swabbing and fire polishing; 4) release and lubricating compounds are no longer needed between the ring and plunger; 5) weld repair of the plunger, typically needed because of the scoring from the ring, is eliminated; and 6) ring material choices are increased because dimensional stability is no longer a primary requirement.

PRIOR ART

U.S. Pat. No. 4,888,040 (Douglas et al.) was described above in some detail. Thus, as acknowledged there, the patent describes a ring/plunger assembly wherein spring means is utilized to provide for continuous engagement. However, this continuous engagement is present between adjacent rings (guide and neck), not between plunger and an adjacent ring. Also, there is no mention of spring loaded segments located in either the plunger or the ring's periphery. Furthermore, this prior art patent describes only a single kickback spring, located between a kickback basket and a spring retainer.

German Patent No. 83,271 (Bouneu) describes a molding device characterized by a tub-shaped stamp consisting of segments in which the stamp segments are pushed apart, or expanded, by way of a plunger. The stamp segments' expansion is opposed, and plunger contact is maintained, through the action of springs. U.S. Pat. No. 947,632 (Bolton) discloses a tool for forming bottle necks wherein it describes two sets of radially-expanding non-rotatable members, each containing a plurality of members constructed such that, when expanded, an uninterrupted forming edge for fabricating the bottle necks is provided. Unlike the present invention, both of the above inventions consist of segments, or members, which expand rather than contract. In addition, neither of the references has the benefit of including air passageways for expelling air from, or introducing air into, the mold cavity.

U.S. Pat. Nos. 1,898,251 (Kopp) and 2,252,292 (Poglein) both disclose means for providing air release between the plunger and ring. Specifically, in Kopp it is disclosed that the plunger be provided with angularly spaced axially extending grooves which act as air vents to avoid suction during the movement of the plunger in the ring. Poglein describes assembled mold units which are threaded together wherein each unit is provided with air passages to provide a space between the assembled units. Neither of these references, however, is provided with, nor do they teach the use of, means for maintaining the mold-ring alignment as is disclosed in the present invention.

DETAILED DESCRIPTION OF THE PREFERRED EMBODIMENT

Figure 1:
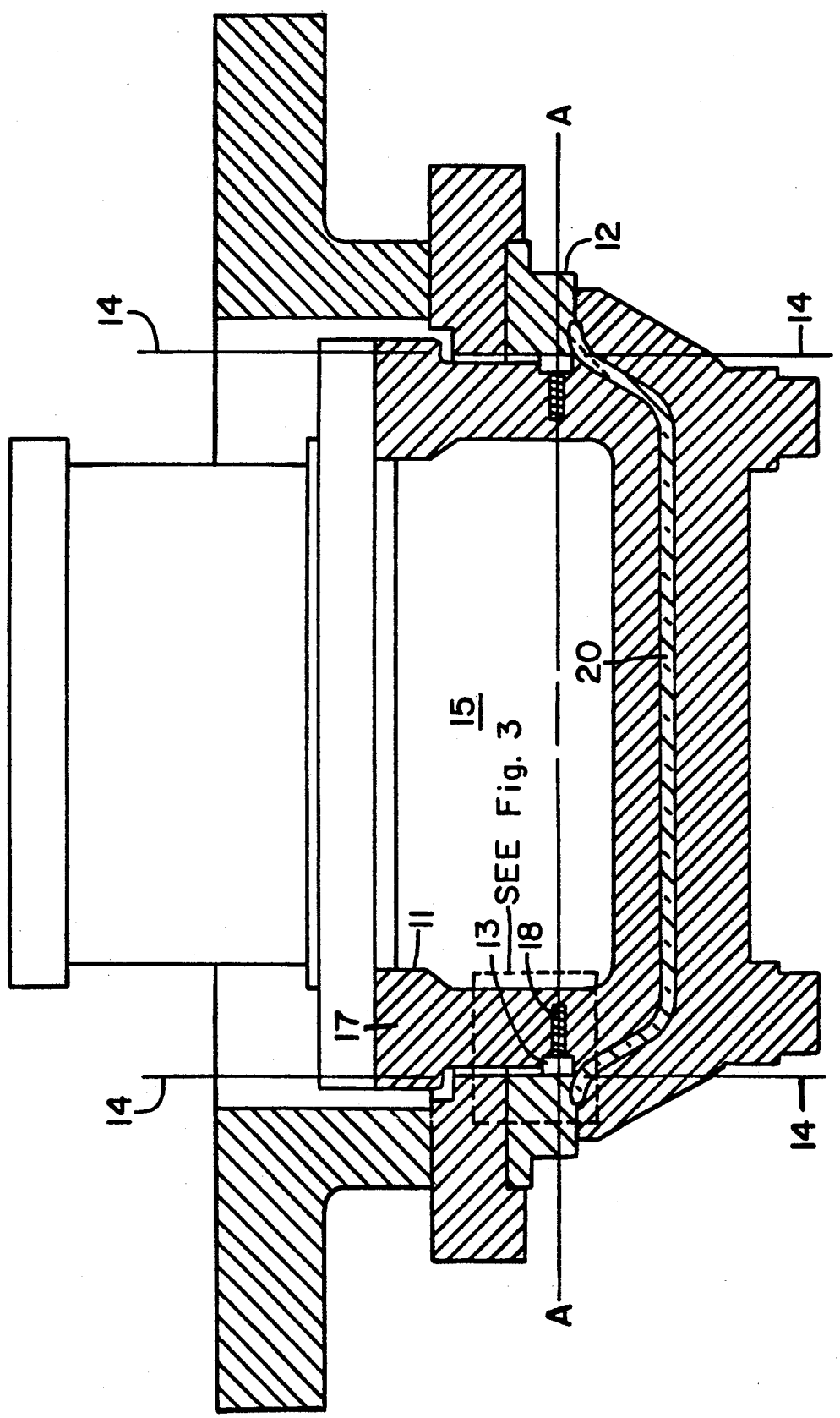
FIG. 1 is a cross-sectional side view of the disclosed forming apparatus comprised of a plunger and ring, or shell, and the peripherally-extending seal formed within the ring/plunger interface area.
Figure 2:
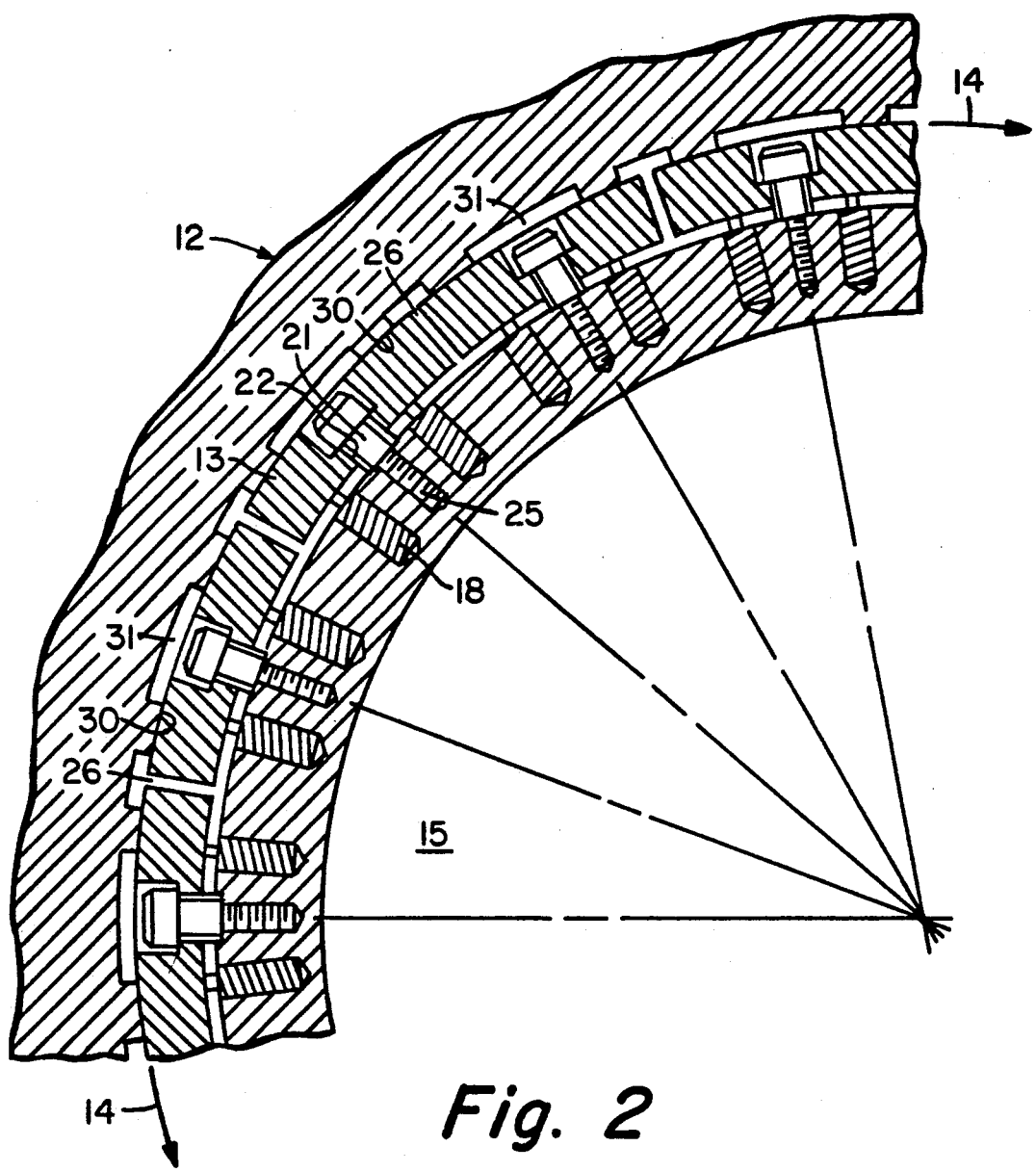
FIG. 2 is a partial cross-sectional view of the apparatus shown as taken along sectional line A—A of FIG. 1.
Figure 3:
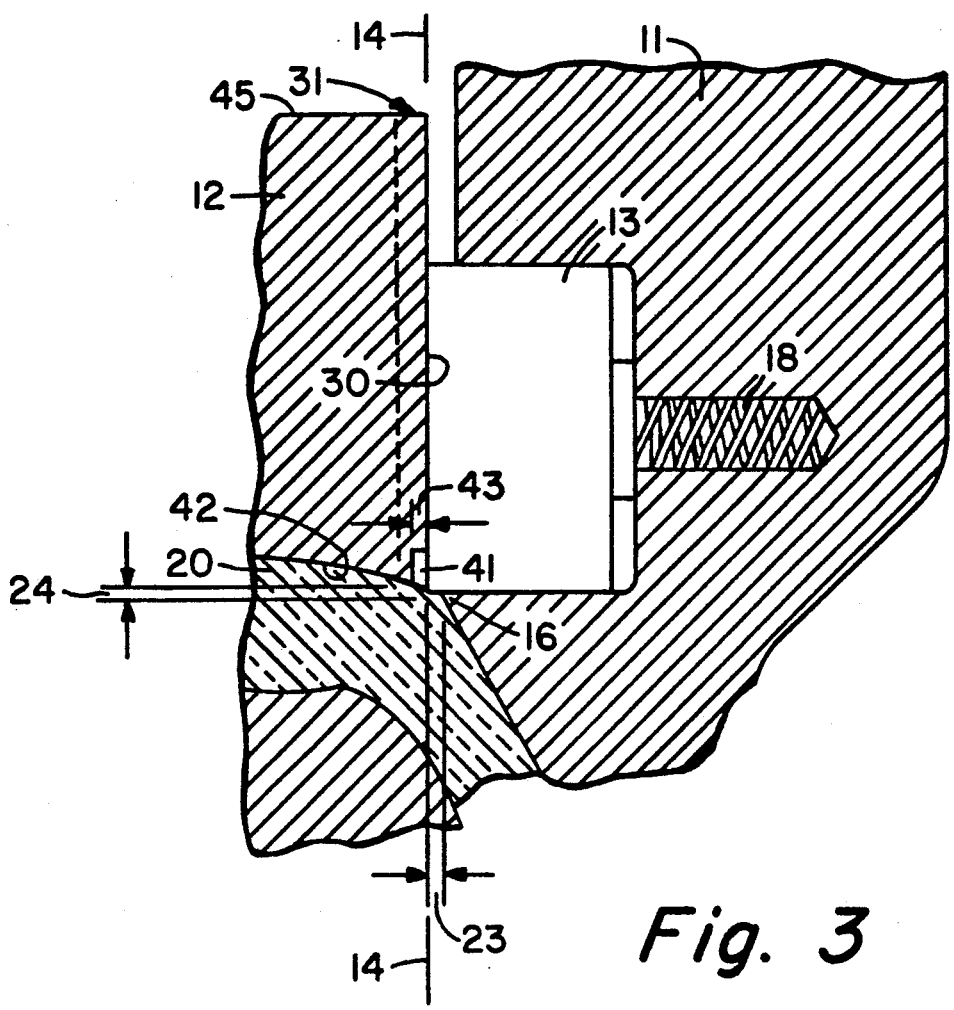
FIG. 3 is an enlarged, isolated cross-sectional view of the ring/plunger interface area outlined in FIG. 1.

As used herein, descriptions pertaining to a ring/plunger apparatus will also be applicable to shell/plunger apparatuses as well. Referring now to FIGS. 1, 2, and 3, plunger 11 contains a plurality of adjacent segments 13, located along and around the plunger's periphery, which are urged away from the plunger and toward the ring by compression spring elements 18. The plunger and ring 12 front wear surface 30 engage to form a substantially continuous sliding fit to provide a seal along the plunger-ring bore interface 14, shown in FIG. 3. This fit, and resultant substantially continuous seal, is flexibly maintained during all phases of operation; including start-up, steady state, process transients and shut down.

Looking again at FIGS. 1 and 2, in conjunction with the enlarged view of interface area 14, FIG. 3, the disclosed continuous, flexible fit plunger/ring apparatus provides for a system where, at no time is there a substantial gap into which glass or other formable material may flow, either at plunger/ring bore interface 14, or between adjacent segments spacing 26, upon a glass seal being formed. Firstly, plunger segments 13 are located in such proximity to each other to essentially prevent the glass, or other material, from flowing between the segments in spacings 26. Yet, spacings 26 are sufficiently large enough to provide minor, acceptable gaps between adjacent segments to avoid binding between such segments.

Secondly, the engagement between the plunger segments and front wear surface 30 along plunger/ring interface 14 is maintained through the relative forceful action of two coiled compression springs elements 18 exerting a combined force range of about 4–8 pounds per linear inch on each segment. These plunger springs 18 contact the back of segments 13, forcing them into constant engagement with front wear surface 30 of ring 12. This constant contact maintains the flexible fit characteristic of the invention and the resulting glass seal between the plunger segments and the ring. Because of this seal, or flexible fit, excessively large fins are avoided. Such fins normally occur as a result of glass flow between the ring and plunger. Elimination of excessively large fins, or fragile appendages, is highly desirable because the possibility of product material contamination due to cracks which typically result is eliminated.

Figure 4:
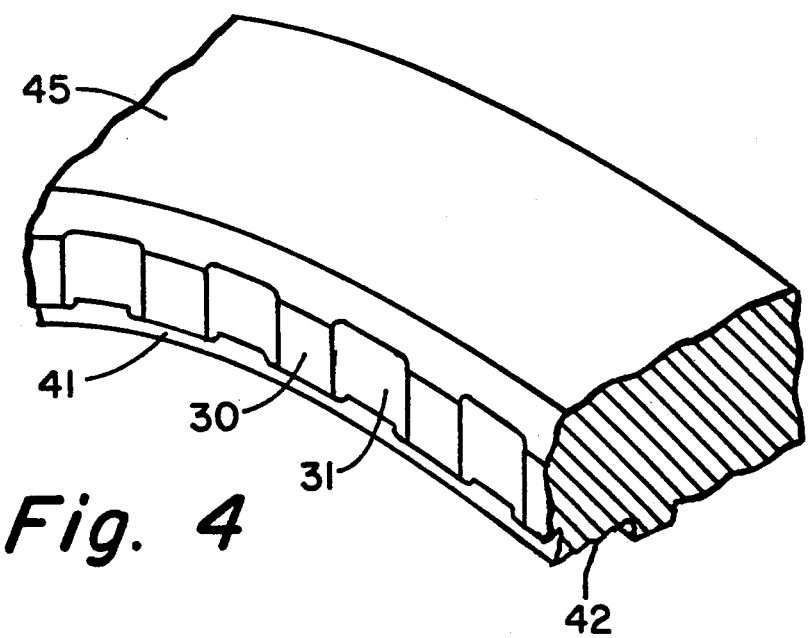
FIG. 4 is an enlarged, broken away perspective view of the ring of the preferred embodiment.

However, an important feature of the invention is that the air is allowed to pass through the ring/plunger interface while maintaining a glass seal therein. This feature can best be viewed in FIGS. 3 and 4 and is achieved through the combination of; (1) including in ring 12 a peripherally-extending undercut portion 41 adjacent to mold cavity 20, and (2) forming into the front wear surface 30 of ring 12 a series of channels 31. Channels 31 extend longitudinally from the top of ring 45 into undercut region 41, but short of the bottom surface 42 of ring 12. The channels have a preferred depth of 0.125 inches and a preferred width of 0.5 inches and these dimensions were used in the Example herein. Thus, this combination of undercut and channels provides for a plurality of discriminatory passages through which air, but not glass or other formable material, may travel from mold cavity 20 along plunger-ring interface 14 to the ambient as the plunger approaches and recedes from mold cavity 20 during the pressing operation.

Because undercut 41 is adjacent to the mold cavity 20 it will be exposed to the glass during the actual pressing of articles. Therefore, depth 43 of undercut 41 must be limited to a depth just slightly less than that depth which will allow glass, or other formable material, to enter/flow into the undercut region 41 to a substantial degree. That is the glass, or other formable material, will flow only slightly into the undercut region at the required process parameters. Experience has shown that although undercut depths as great as 0.008 inches produce acceptable products, 0.005 inches is the most preferred depth and was used in the Example herein.

Another consideration of this apparatus is spring elements 18 must not exert too great a force to cause segment 13 to bind against the front wear surface 30 of ring 12 causing scoring and leading to ring and/or segment destruction. The use of a spring urging means having a spring constant of approximately 32 pounds force per linear inch to provide a combined 4–8 pounds per linear inch force range will sufficiently avoid this problem.

This unique and flexible system also minimizes the abrasion which can occur along ring/plunger interface 14 as a result of normal ring-plunger thermal expansion mismatches. Interface damage is typically incurred during process transients, such as during start-up, when tools experience significant thermal growth and expansion rates between contacting tooling which are not perfectly matched. This situation can lead to binding along interface 14 and subsequent damage either to the ring or plunger. The flexible ring/plunger system provides for a continuous flexible sliding fit condition between segment 13 and the ring's outer wear surface 30 through all phases of the operation. This is accomplished through the forcing action of spring elements 18 flexibly urging segments 13 against the ring wear surface 30.

FIGS. 1 and 2 show the proximity of segments 13 to the plunger's cooling jacket 15, in which water is typically circulated in the center of plunger 11 to maintain optimal process temperatures. By locating spring elements 18 in close proximity to cooling jacket 15, spring elements 18 are ensured a prolonged life at the high operating temperatures typical in glass pressing operation utilizing a water-cooled plunger 17 as shown in the drawings.

In FIG. 2, a plurality of adjacent segments are shown secured to the plunger by a retaining means which limits both tangential and radial movement of these segments. In the preferred embodiment this retaining means consists of a shoulder bolt 25 having a shank length long enough for the bolt to extend through the corresponding segment into the plunger where it is secured. The bolt's shank diameter 21 is sized such that, prior to heating the tooling materials, the shank's diameter is smaller than the opening diameter defined by bore diameter 22, to allow one to loosen the bolt to easily remove the segment. After both the shank and segment thermally expand, shank diameter 21 must be slightly smaller than the diameter of bore 22 to allow the segment to slide along the shank's length without binding, but at the same time limiting peripheral movement to an acceptable amount which will allow for the production of acceptable products.

For example, a steel bolt having a diameter 21 of 0.25 in., is used in the pressing apparatus used in the later described Example. During non-pressing, unheated conditions, this bolt had 0.005 in. of clearance when placed in bore 22 of corresponding tungsten carbide segment 13. Upon thermally induced expansion, this arrangement provided the proper fit, i.e., smallest clearance which would both allow a segment to slide along the bolt's length without excessive tangential or radial movement. However, it has been found that a bolt/bore clearance as high as 0.025 inches will provide segment freedom while still allowing for the for the segment to produce the desired results within the ring plunger interface.

In viewing FIG. 3 it can be seen that the location of segments 13 within plunger 11 along interface 14, in conjunction with the sizing of ring 12, determines the amount of the segments' area which comes into contact with the molten glass in mold cavity 20 during the actual pressing. It is necessary that some area of the segment contact the glass to seal off the material flow front; however, only a small portion 16 of the segment should actually be exposed. Having a small area of exposure is important for two reasons: (1) it prevents the pressing pressure in the glass flow front from overcoming the force being exerted by spring elements 18, thereby compressing springs 18 and creating a large gap at the plunger-ring interface area 14 into which the glass may flow; and (2) it limits the size of the nubbin which is formed when the glass pushes up, to a very limited extent between adjacent segments. Thus, the acceptable dimensional values of horizontal protrusion 23 and vertical protrusion 24 of segment 13 into the material being formed are dependent upon the forming characteristics of the material being pressed. Preferred maximum values, for either horizontal and vertical protrusion values, for most formable materials, are 0.050 inches, or less.

Suitable segment material should exhibit both good wear and favorable glass contact characteristics such as low wettability and low product material contamination. Materials possessing these characteristics are thus typically used as glass forming tooling, i.e., mold, plunger, and/or ring materials. The following list, though not exhaustive, is typical of representative segment materials; graphite, stainless steel, tool steel, electroless nickel plated steel, chrome plated steel, tungsten carbide steel and cast iron. It is contemplated that any other material possessing the above-mentioned characteristics would likely be a suitable material for a segment. Another important material consideration to be taken into account is that the material utilized for the segments should be different than that of the wear surface on the ring. Material incompatibility, i.e., plunger and ring "sticking", becomes a concern when the two components are comprised of the same material.

Proper segment arc length sizing is another consideration which is dependent upon numerous factors. Ultimately, the proper size is dependent upon product shape/size, acceptable nubbin size and spacing limitations, i.e., a segment's arc length must be large enough for a retaining means such as a bolt to be attached to it and for springs to act upon it. The nubbin size itself is dependent upon the area of spacing 26 which is exposed to the molten glass during actual pressing. This area is, in turn, a function of the previously discussed horizontal 23 and vertical 24 protrusions and the amount of the actual segment-to-segment spacing 26 (FIG. 2). The amount of the segment-to-segment spacing should be small enough to essentially prevent glass flow, even though some vertical and horizontal protrusion exists. However, as described above, some amount is desirable to avoid segment binding.

Therefore, in the preferred embodiment, small amounts of glass does flow between adjacent segments resulting in minor nubbins. The automotive lighting reflector described in following example was produced with acceptable nubbins of 0.005 in. high or less. To obtain these values, the start-up dimensions for the pressing apparatus used in the Example were: (1) eight 1.5 in. tungsten carbide segments (arc length) spaced about 0.002 in. therebetween; and (2) protrusion values obtained in the example were 0.020 in. for the horizontal protrusion value and 0.010 in. for the vertical protrusion.

EXAMPLE

A glass charge having the composition of Corning code 7251 glass, marketed by Corning Incorporated, Corning, N.Y., and consisting essentially, in weight percent on an oxide basis, of about 77.4% $SiO_2$, 5.3% $Na_2O$, 15.4% $B_2O_3$, 1.9% $Al_2O_3$, and 0.48% Cl, was delivered to a mold/press assembly as depicted in FIGS. 1 and 2 and assembled in the manner described above. The press mold assembly was sized and shaped for an automotive lighting reflector with dimensions of 0.060 in. thick by 4 in. diameter. The segment configuration as previously described above, consisted of eight spring loaded segments, in which springs having a 32 lbs./in. spring constant provided a combined spring force rate per segment in the range of 4-8 pounds/linear inch. The 1.5 inch arc-length tungsten carbide segments were peripherally spaced about 0.002 inches apart from each other within the plunger.

These tooling components were heated to a temperature range of 400-500° C. so that the tooling components contacting the glass neither checked the glass by being too cold, nor stuck to the glass by being too hot. The glass charge, large enough to ultimately fill the mold cavity, was then delivered at a temperature such that the glass exhibited a viscosity range of 2000-3000 poise. The product was then produced utilizing a pressing pressure of 300 lbs./in.$^2$. The finished pressed piece possessed no fins or checks and exhibited nubbins between about 0.001-0.005 in. high.

Figure 5:
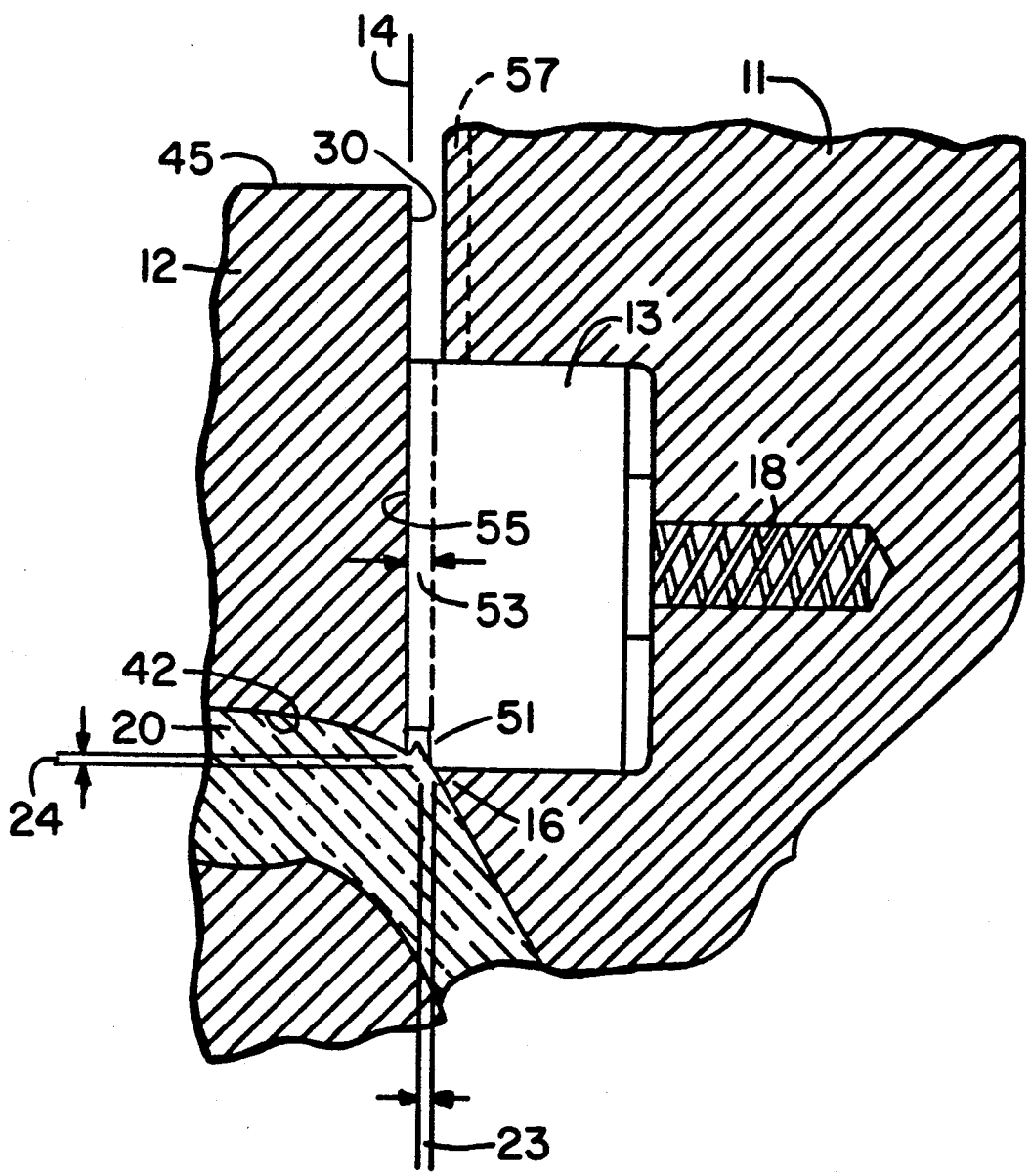
FIG. 5 is an enlarged isolated cross-sectional view of the ring/plunger interface area of an alternative embodiment of the disclosed invention.

An isolated view of an alternative embodiment of the disclosed plunger/ring apparatus is shown in FIG. 5 of the drawings. As shown in FIG. 5, segment 13 is provided with an undercut portion 51 and an upwardly extending channel 53 in the front wear surface 55 of the segment. Such an arrangement is in lieu of providing the undercut portion and the channel in the front wear surface 30 of ring 12 of the apparatus as previously discussed. In some cases it may be necessary to provide an additional channel, or groove, in the outer periphery of plunger 11 for each segment to ensure adequate air flow to, and from, the mold cavity to ambient via the channel 53 and optional second channel 57. This will be especially so if there is to be a small dimensional tolerance between plunger 11 and front wear surface 30 of ring 12. It may also be necessary that segment 13 have a certain amount of vertical and horizontal protrusion, 23 and 24 respectively, into mold cavity 20 as discussed previously.

The disclosed flexible plunger/ring fit pressing assembly has a fairly broad application, i.e., it can be used in production for a variety of shapes, including both flat disks as well as round or rectangular objects, of various depths. Its application encompasses a range of tooling materials as well as varied glass delivery viscosities, compositions and pressing pressures. Although this flexible plunger/ring fit system is referenced and described specifically to glass ware forming, it should be appreciated that practice of the invention is not necessarily limited to this material. In particular, it is contemplated that this system would be easily applicable to other formable materials such as ceramics, plastics, or metals.

While particular embodiments of the invention have been shown and described, various modifications are within the scope of the invention. The appended claims are, therefore, intended to cover all such modifications.

We claim:

1. A ring and plunger apparatus for press-forming glass, or other formable material, in a mold cavity comprising:
   a) the ring having a front wear surface, a bottom surface, and a peripherally extending undercut portion located along the front wear surface and the bottom surface; and
   b) the plunger having a plurality of adjacent, slidably mounted, peripherally-extending segments located in such proximity to each other to essentially prevent the formable material from flowing between the segments upon press-forming the formable material, the segments having sufficient spacing between each other to prevent binding between adjacent segments upon urging the segments into contact with the ring;
   c) a plurality of air passageways extending longitudinally from the undercut portion of the ring along a region defined as a plunger-ring interface wherein a seal is formed between the segments and the ring which allows air, but not the formable material from the mold cavity, to pass beyond the undercut to ambient upon press-forming the formable material.

2. The apparatus of claim 1 wherein the segments are removably secured to the plunger by a retaining means for limiting movement of the segments.

3. The apparatus of claim 1 wherein the segments are urged into contact with the front wear surface of the ring by urging means exerting a force in the range of 4-8 pounds per linear inch of segment length.

4. The apparatus of claim 1 wherein the segments are comprised of a material selected from the group consisting of graphite, stainless steel, tool steel, nickel plated steel, chrome-plated steel, tungsten-carbide, and cast iron.

5. The apparatus of claim 1 wherein the front wear surface of the ring is comprised of a material different than the plunger material.

6. The apparatus of claim 1 wherein adjacent segments are spaced less than 0.005 inches apart from each other.

7. The apparatus of claim 1 wherein the undercut portion has a depth of less than 0.010 inches.

8. The apparatus of claim 1 wherein the segments protrude vertically into the formable material less than 0.05 inches and protrude horizontally into the formable material less than 0.05 inches while the material is being press-formed.

9. The apparatus of claim 1 wherein the passageways are shaped in the form of channels less than 0.250 inches in depth and less than 1 inch in width.

10. A ring and plunger apparatus for press-forming glass, or other formable material in a mold cavity comprising:
   a) the plunger having a plurality of adjacent peripherally-extending segments having a front wear surface and a bottom surface, the segments having an undercut portion extending along the front wear surface and the bottom surface thereof, the segments being located in such proximity to each other to essentially prevent the formable material from flowing between the segments, the segments having sufficient spacing between each to prevent binding among adjacent segments upon urging the segments into contact with the plunger;
   b) the ring having a front wear surface and a bottom surface; and
   c) at least one air passageway located on the front wear surface of one or more of the segments and extending upwardly from the undercut portion of the segment along a region defined as a plunger-ring interface to ambient wherein a seal is formed between the segments and the ring which allows air, but not the formable material from the mold cavity to pass through the passageways to ambient upon press-forming the formable material.

11. The apparatus of claim 10 further comprising a plurality of upper air passageways located on the plunger and/or the ring and extending upwardly to ambient, the upper passages connect with one or more of the passageways located in the front wear surface of the segments thereby providing enhanced air flow from the undercut region to ambient.

* * * * *